United States Patent [19]

Schieser et al.

[11] 4,032,106

[45] June 28, 1977

[54] SELF-SEALING VALVE

[75] Inventors: Warren J. Schieser; John R. Sneeden; R. Alan Feltner, all of Columbus; Curtis J. Bond, Marion, all of Ohio

[73] Assignee: Corco, Inc., Worthington, Ohio

[22] Filed: June 4, 1976

[21] Appl. No.: 693,220

[52] U.S. Cl. .......................... 251/144; 251/335 A; 251/347

[51] Int. Cl.$^2$ ......................................... F16K 7/06

[58] Field of Search ............. 251/318, 335 A, 144, 251/347; 222/546, 499, 518, 213, 517, 490

[56] References Cited

UNITED STATES PATENTS

| | | | |
|---|---|---|---|
| 1,940,706 | 12/1933 | Aufricht | 222/499 |
| 2,721,004 | 10/1955 | Schultz | 222/519 X |
| 3,123,337 | 3/1964 | Peras | 251/347 X |
| 3,606,107 | 9/1969 | Ardito et al. | 222/546 |
| 3,874,567 | 4/1975 | Collie | 222/499 |

*Primary Examiner*—Allen N. Knowles
*Assistant Examiner*—Norman L. Stack, Jr.
*Attorney, Agent, or Firm*—William V. Miller

[57] ABSTRACT

A self-sealing dispensing valve for use on various containers. It is a simple two-piece device consisting of an outer housing having a dispensing outlet and an inner complemental valve member which ordinarily closes the outlet but which can be moved by finger pressure to open the outlet, and which will automatically return to its closed position when opening pressure is released. The housing has a flexible dome-shaped outer wall which embraces and is attached to a complemental dome-shaped rigid wall at the outer end of the valve member, which also has an axially inwardly extending flared sealing skirt. The skirt normally seats on the outlet, which extends radially through the correspondially tapered housing, but will be displaced axially inwardly to open the outlet, upon inward axial pressure on the outer dome-shaped flexible housing wall. Internal container pressure aids in the normal seating of the valve member.

11 Claims, 7 Drawing Figures

SELF-SEALING VALVE

BACKGROUND OF THE INVENTION

Self-Sealing dispensing valves of the general type with which this invention deals have been provided in the past. These have usually been formed of suitable plastic and are generally applied to various containers usually also of plastic, and being semi-rigid or rigid, or even plastic bags with rigid or semi-rigid necks. Example of prior art valves of this general type are shown in U.S. Pat. Nos. to Buford 3,595,445; Bourget 3,384,120 and Lofdahl 3,263,875. Bourget and Lofdahl are composed of three parts making them relatively difficult to produce and assemble and difficult to close and keep hygienic in use. Buford is composed of two parts but has a ported transverse wall which divides the valve chamber into two portions, this arrangement also making the valve more difficult to produce and to maintain hygienic conditions in use. In some of these valves internal pressure acts against sealing and some are so designed as to provide a minimum of sealing area at the dispensing outlet.

SUMMARY OF THE INVENTION

The present invention is a self-sealing dispensing valve assembly which can be mounted on various containers to dispense the contents thereof and especially liquid contents. The valve is ordinarily closed, aided by internal container pressure, but can be easily operated by one hand, using finger-pressure to open it. When the pressure is released, the valve will automatically closed and seal, internal container pressure enhancing this action.

This valve assembly is composed of two parts only, preferably of plastic, which are of simple form and therefore relatively simple and inexpensive to mold. The parts consist of an outer housing and an inner valve member. The housing is of annular sleeve-like form having a flanged inner end, for mounting on the neck of a container, with a tapered frusto-conical innersealing surface, a radially-leading dispensing outlet and spout from said surface, and a flexible wall its outer end which is dome-shaped and, in the final assembly, carries the inner valve member. The inner valve member is of inverted cup-like or frusto-conical form and includes an outer rigid wall of dome-like form, which is complemental to the housing dome wall and is carried thereby, and an axially-extending sealing skirt which has an outer sealing surface complemental to and normally seating on the tapered sealing surface of the housing. The two assembled parts are normally in closed position relatively, with the two complemental dome-shaped walls in intimate embracing contact and with the sealing skirt seating fully around the inner end of the dispensing outlet of effectively seal it. However, the valve may be easily opened by inward axial pressure on the outer flexible dome wall of the housing to displace the valve member axially inwardly, causing its flared skirt to move away from the inner tapered sealing surface of the housing and to open the outlet. As soon as the pressure is released, the valve member will automatically move axially-outwardly into sealing position, and internal container pressure will aid in accomplishing and maintaining the seal.

BRIEF DESCRIPTION OF THE DRAWINGS

The best mode contemplated in carrying out this invention is illustrated in the accompanying drawings in which.

DETAILED DESCRIPTION OF THE DRAWINGS

Figure 1:
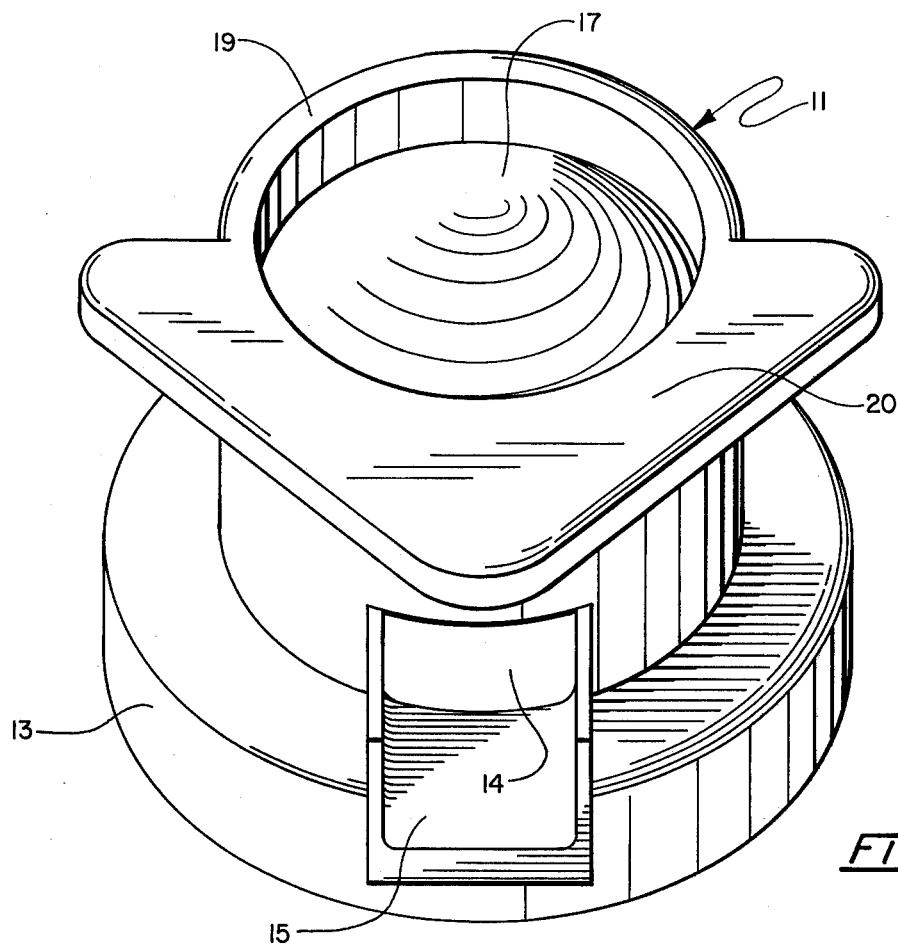
FIG. 1 is a perspective view showing one of the parts of the valve before assembly.
Figure 2:
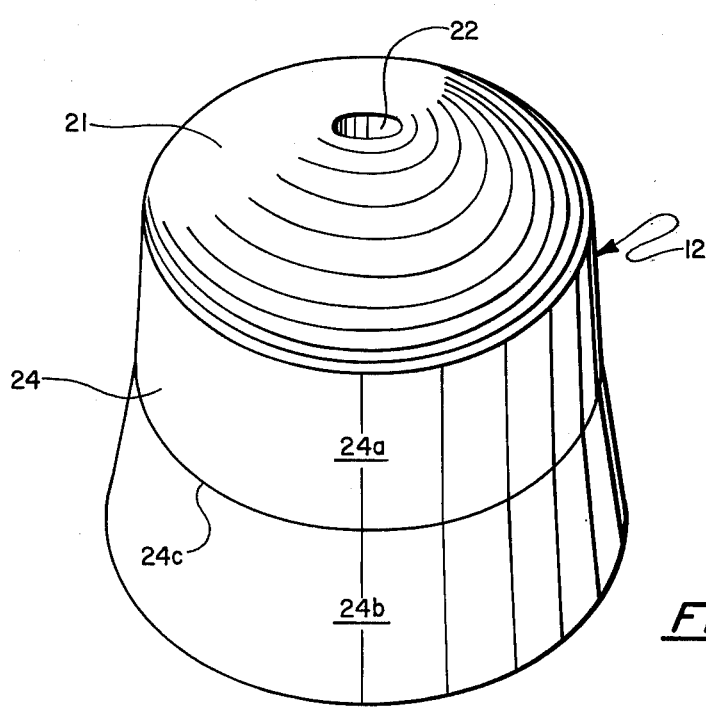
FIG. 2 is a similar view showing the other part of the valve.

With specific reference to the drawings, the two parts of the valve consist of the sleeve-like housing 11 shown in FIG. 1 and the inverted cup-like valve member 12 shown in FIG. 2. These members are preferably made of suitable plastic and each is of annular cross-section, the valve member 12 being adapted to fit within the housing 11 to form the valve assembly as shown in FIGS. 3 to 6.

Figure 3:
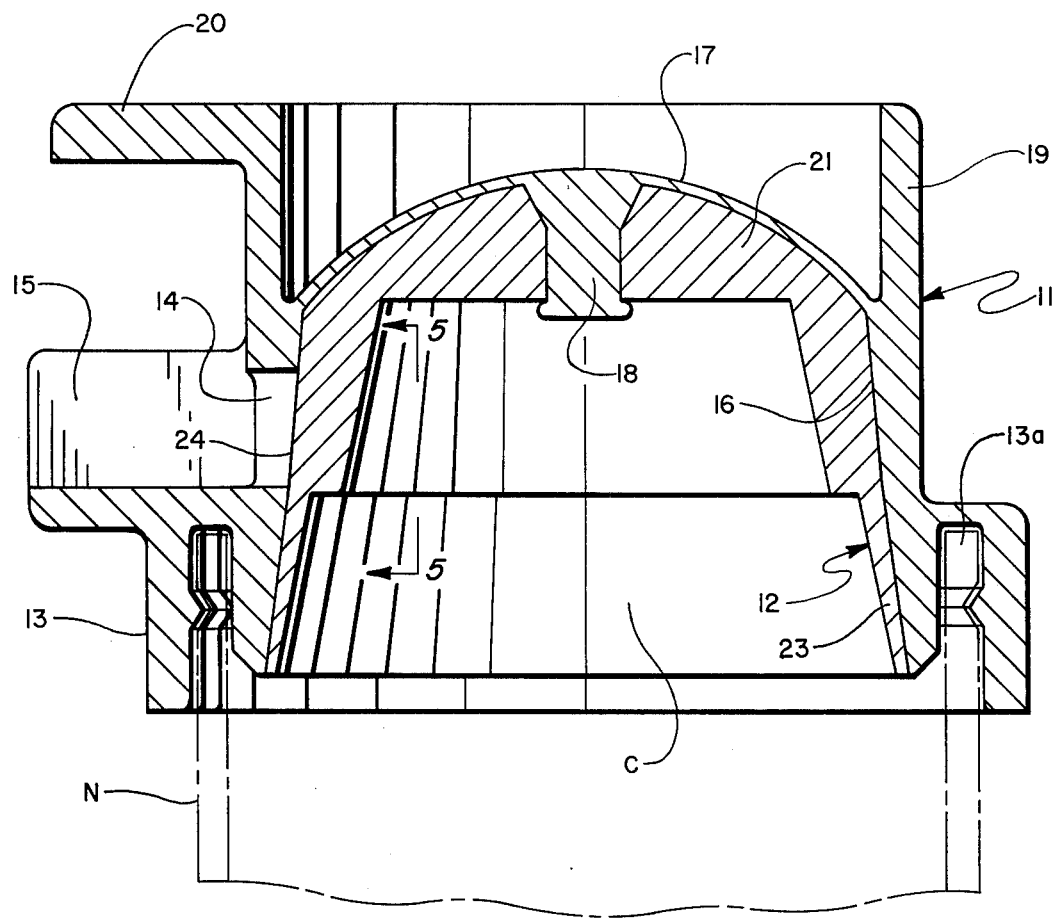
FIG. 3 is an axial sectional view of the assembled valve showing it in sealing or closed position.

The housing 11 is of one piece and, as indicated, is of annular tubular or sleeve form and has a double-flanged inner end 13 to provide an annular socket or groove 13a designed to receive the neck N of a container indicated in broken lines in FIG. 3. This flanged end 13 may be designed to slip onto the neck of any suitable container with a sealing fit and this invention is not limited to the particular form shown.

Intermediate the axial extent of the housing 11, and outwardly of the flanged inner end 13, the housing is provided with a dispersing outlet 14 which leads into a radially-outwardly projecting preferably slightly wider dispensing spout 15. The inner surface of the sleeve provides a tapered frusto-conical sealing surface 16 and the inner end of the outlet is at this surface. This surface 16 has two annular areas 16a and 16b of slightly different taper merging at a line level with the inner extent of outlet 14. It will It will be noted from FIG. 5 that this outlet is of substantial, arcuate extent. Outwardly of the sealing surface 16, there is provided a flexible dome-shaped wall or diaphragm 17 which closes the outer end of the housing 11. It carries on its inner surface a centrally disposed stem 18 designed to carry the valve member 12 in a manner to be described. The housing preferably extends axially outwardly to provide a protective annular extension lip 19 which projects beyond the dome wall 17 in its normal outwardly-flexed convex position. The outer annular lip extremity 19 is provided with a laterally projecting flange 20 having the outline of the point of an arrow and aligning with the dispensing spout 15, to indicate the direction in which it extends.

The valve member 12 is also of one-piece annular form and is of inverted cup-like or frusto-conical form. At its axially outer end, it has a rigid wall 21 of convex or dome-like form which is complemental to the inner concave surface of the normally-extended dome wall 17 of the housing 11. This wall 21 has a centrally-located opening 22, for receiving the attaching stem 18 which extends axially inwardly from the wall 17. The dome wall 21 carries the rigid sealing skirt 23 which is of annular frusto-conical form to provide an outer annular sealing surface 24 of frusto-conical form complemental to the frusto-conical sealing surface 16 of the housing 11. The surface 24 preferably has two annular areas 24a and 24b of slightly different taper merging at the line 24c, and the housing surface 16 has the similarily complementally formed surfaces 16a and 16b, It will be noted that surfaces 16b and 24b are more flared than the respective adjacent surface 16a and 24a. This double-tapered sealing surface provides separate sealing bands which make for a better seal in case of distortion in molding and curing.

When the valve is assembled, the valve member 12 is slipped axially into the housing 11 and the stem 18 is pressed into the opening 22 and is retained by a shoulder formed on the end of the stem. At this time, the convex surface of the valve wall 21 is in intimate embracing sealing contact with the inner concave surface of the extended flexible wall 17. Also at this time, the sealing surface 24 of the valve 23 is in intimate embracing sealing contact with the complemental sealing surface 16 of the housing 11. This condition is illustrated in FIG. 3, and it will be noted from this figure and FIG. 5, that the skirt 16 will completely cover the dispensing outlet opening 14 and extend beyond it in all directions to effectively seal it. After assembly, the attaching stem 18 is preferably heat-welded in the opening 22. It will be noted that the convex wall 21 of the valve member 12 is provided with a reinforcing spider 21a formed on its lower surface with the opening 22 at its center.

Figure 4:
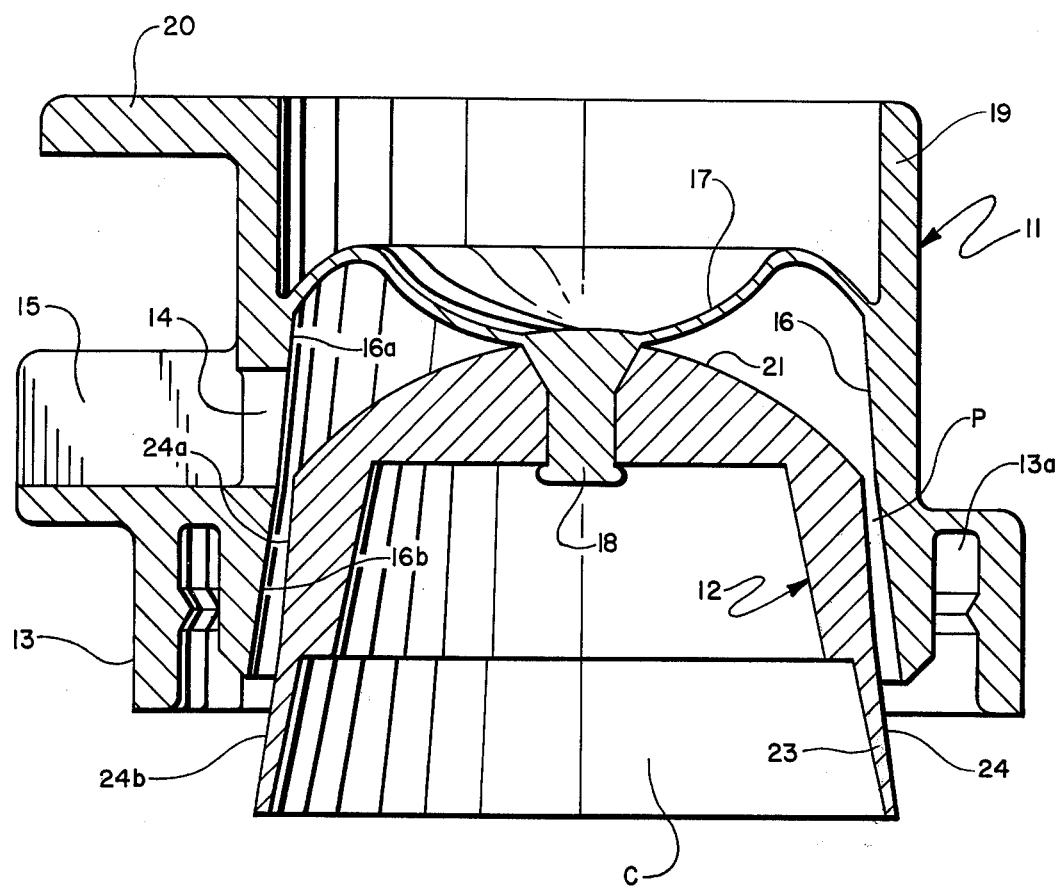
FIG. 4 is a similar view showing the valve in unsealed or opened condition.
Figure 5:
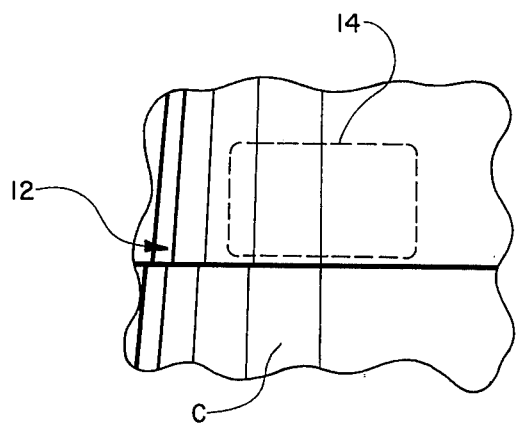
FIG. 5 is an enlarged detail taken at the position indicated at line 5—5 of FIG. 3 showing the shape of the outlet and how the flared valve skirt of the valve member seats completely around it.
Figure 6:
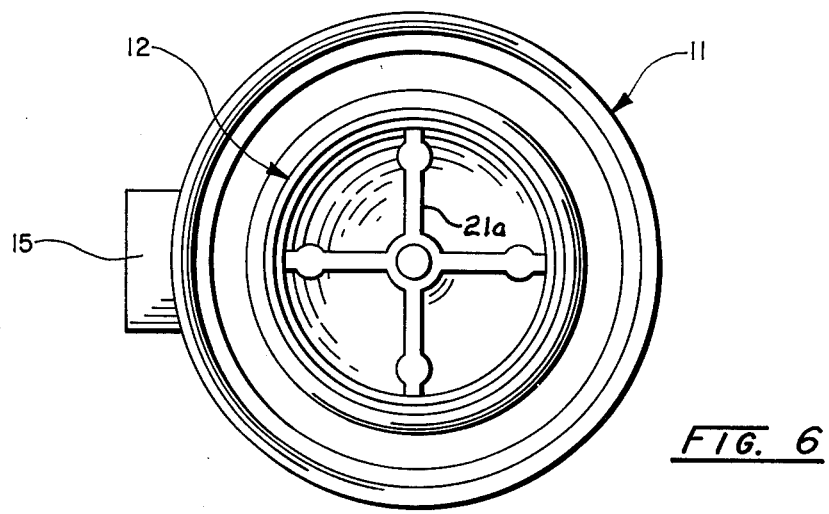
FIG. 6 is a bottom view of the assembled valve.
Figure 7:
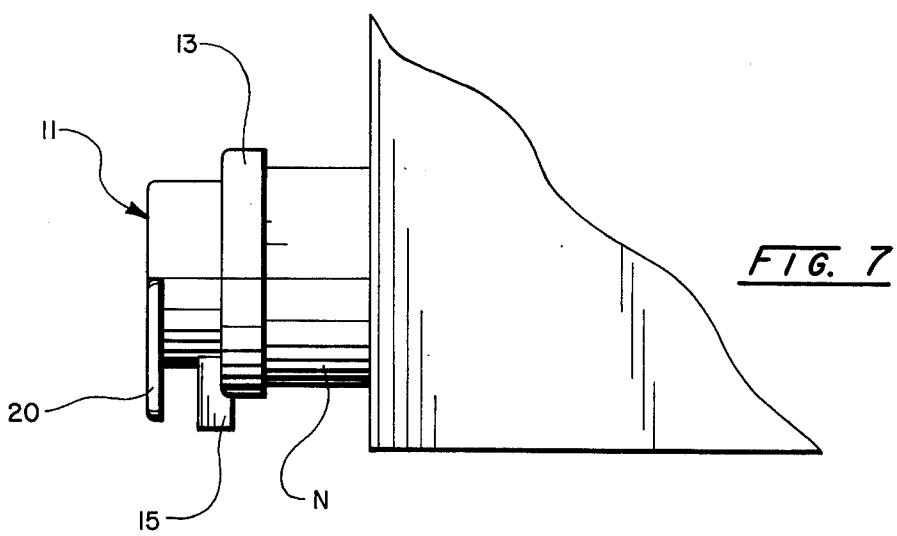
FIG. 7 is a schematic view in side elevation showing the position the valve will be in during dispensing.

The condition of the valve assembly illustrated in FIG. 3 is the normally-closed or sealing position. The valve-assembly, on a container, can be operated by one hand and, by finger-pressure, the flexible diaphragm wall 17 may be pressed inwardly to open the valve. The valve will be held to position the dispensing spout 15 downwardly, as indicated in FIG. 7, the proper position being indicated by the arrow point 20. The inward axial pressure flexes the wall 17, as indicated in FIG. 4, to displace the valve member 12 axially inwardly and thereby quickly unseat the valve skirt sealing surface 24 from the housing sealing surface 16. This opens the outlet 14 and provides an annular passage P between surfaces 16 and 24 to permit the container contents to pass axially-outwardly to the outlet opening 14 to thereby permit dispensing through spout 15. It will be noted that the valve member 12 has a single chamber C which is always in communication with the container. As soon as inward axial pressure is released from the flexible wall 17, it will expand to its original outwardly-displaced convex position, shown in FIG. 3, to bring the cooperating surfaces of dome walls 21 and 17 into sealing contact and, also, to return the skirt 23 axially outwardly to cause its surface 16. Since chamber C communicates with the container neck N, any internal pressure in the container will aid in maintaining the seal. The dispensing outlet 14 will thus again be closed and will be sealed by substantial areas of the skirt 23 overlapping the outlet completely around its border. The two bands 16b – 24b and 16a 24a will provide two areas of sealing contact at different axial positions. As the vave member 12 seats, the container contents, in the space between it and the housing 11, will be forced through the outlet 14 or back into neck N, through the passage P, so that all contents will be returned into the container thereby keeping all the sealing surfaces clean.

It will be apparent that this invention provides a self-sealing dispensing valve assembly which is formed of two simple complemental parts which are secured together as a single unit. The parts are simple and can be readily molded and assembled. They provide an assembly in which the valve member will effectively seal the outlet, aided by internal container pressure, but which can be readily displaced by finger-pressure to open the dispensing outlet. The housing is shaped to indicate proper positioning for dispensing. The valve member is so formed that when it seals the contents in the valve will either be dispensed through the outlet or will be displaced back into the container so as to maintain hygienic conditions. Because of the form of the valve assembly, separate sealing areas are provided to prevent leakage at the dispensing outlet. The simplicity of the assembly makes it possible to produce it at a sufficiently low cost that it can be discarded after being used once, if desired.

Having thus described this invention what is claimed is:

1. A self-sealing dispensing valve assembly consisting of two parts only, namely an outer sleeve-like housing of annular form and an inner valve member of inverted cup-like annular form; said housing having an open inner end and an outer end closed by a transversely-extending normally-convex flexible diaphragm exposed at its outer face and a radially-leading outlet extending through the housing sleeve at a location axially inwardly of the flexible diaphragm, said housing sleeve having a frusto-conical inner annular sealing surface at which the inner end of the radial outlet is located, and said valve member comprising a transversely extending outer rigid wall of convex form complemental to said convex flexible diaphragm and attached thereto at the center thereof, said valve member having an axially inwardly extending annular skirt having a frusto-conical outer sealing surface which is complemental to and normally seats on said inner frusto-conical sealing surface of the housing to seal around said outlet, inward pressure on said convex flexible diaphragm flexing it axially to displace said valve member axially inwardly causing the skirt thereof to move with its frusto-conical sealing surface away from the cooperating frusto-conical sealing surface of the housing to unsea the dispensing outlet, and release of the pressure permitting the valve member to return axially outwardly where it convex wall is in complemental contact with the concave inner surface of said flexible diaphragm and the frusto-conical sealing surfaces of the valve member and housing sleeve are in sealing contact.

2. A self-sealing valve according to claim 1 in which the inner end of the housing has a formation to fit the neck of a container on which it is to be mounted.

3. A self-sealing valve according to claim 2 in which the skirt of the valve member is hollow to form a central chamber therewithin which communicates at all times with the interior of the neck of the container.

4. A self-sealing valve according to claim 1 in which the housing has a radially-extending dispensing spout extending from said outlet.

5. A self-sealing valve according to claim 1 in which the housing has an arrow extending radially therefrom in the same direction as said spout and in alignment therewith.

6. A self-sealing valve according to claim 1 in which the convex wall of the valve member is attached to said flexible convex wall of the housing by an axially inwardly extending stem on the latter which fits into a centrally located opening in the former.

7. A self-sealing valve according to claim 6 in which the stem and valve convex wall are welded together.

8. A self-sealing valve according to claim 1 in which the frusto-conical outer sealing surface of the valve skirt extends in all directions substantially beyond the border of the outlet to provide a substantial overlapping sealing surface around the outlet.

9. A self-sealing valve according to claim 8 in which the housing sealing surface is divided into an inner band and an outer band with the band having a greater flare and the two bands merging at the inner side of the outlet, the skirt of the valve having similar complemental bands for cooperating therewith.

10. A self-sealing valve according to claim 1 in which the housing has an outward axial extension beyond the convex flexible wall thereof to protect it.

11. A self-sealing valve comprising a housing of annular form having an open inner end and an outer closed end, a flexible normally-convex diaphragm wall closing the outer end, an an inner valve member carried by said flexible wall for axial inward displacement upon applying inward pressure to said wall, said valve member having a convex outer wall complemental to said convex flexible wall and normally seating thereagainst, and an axially inwardly-extending sealing skirt carried by said convex wall of the valve member, said skirt having an outer frusto-conical sealing surface and said housing having an inner complemental frusto-conical sealing surface normally in sealing contact, and an outlet leading from the housing at said sealing surface thereof and normally covered by said skirt.

* * * * *